United States Patent [19]

Gardner

[11] Patent Number: 5,685,164
[45] Date of Patent: Nov. 11, 1997

[54] REFRIGERATION UNIT

[75] Inventor: Nicholas Alan Gardner, Banbury, United Kingdom

[73] Assignee: Carter Refrigeration Display Limited, United Kingdom

[21] Appl. No.: 498,246

[22] Filed: Jun. 29, 1995

[51] Int. Cl.$^6$ .................. F25B 41/04; G01J 1/20
[52] U.S. Cl. .................. 62/217; 62/498; 137/297; 251/366
[58] Field of Search .................. 62/498, 217, 292, 62/503; 251/366; 137/597

[56] References Cited

U.S. PATENT DOCUMENTS

| | | | |
|---|---|---|---|
| 1,664,909 | 4/1928 | Thomson | 62/292 X |
| 3,525,234 | 8/1970 | Widdowson | 62/324.1 |
| 5,131,240 | 7/1992 | Kohashi et al. | 62/217 |
| 5,341,846 | 8/1994 | Framberg | |
| 5,558,124 | 9/1996 | Randall | 62/292 X |

FOREIGN PATENT DOCUMENTS

| | | |
|---|---|---|
| 2 546 281 | 11/1984 | France. |
| 1 400 104 | 7/1975 | United Kingdom. |
| 1 444 609 | 8/1976 | United Kingdom. |
| 1 519 752 | 8/1978 | United Kingdom. |

*Primary Examiner*—William E. Wayne
*Attorney, Agent, or Firm*—Kirschstein et al.

[57] ABSTRACT

A refrigerator unit provided with a control means comprising a plurality of valves, the control means comprising a unitary valve manifold made as a one piece casting having said valves operatively mounted thereon.

18 Claims, 3 Drawing Sheets

REFRIGERATION UNIT

BACKGROUND TO THE INVENTION

This invention relates to a refrigeration unit of the kind, hereinafter referred to as being of the kind specified, comprising an evaporator, having a working surface, in which a refrigerant under a first pressure undergoes a liquid to vapour phase change to cool the working surface of the evaporator, a compressor to compress the vapour to a second pressure, which is higher than the first pressure, means to feed the compressed vapour to a condenser where the refrigerant undergoes a vapour to liquid phase change, the condenser being connected to the evaporator through an expansion valve and the refrigerant being subjected to the second pressure on the side of the expansion valve connected to the condenser and to the first pressure on the side of the expansion valve connected to the evaporator and a control means to control the flow of refrigerant through the evaporator.

The control means may comprise a refrigeration/expansion valve means to control the rate of flow of refrigerant to the evaporator, a suction control valve means to control the flow of refrigerant from the evaporator, and a de-frosting valve means to control supply of warm refrigerant gas to the evaporator to control defrosting. (Referred to herein as of the kind described).

Generally a plurality of evaporators are connected to a common compressor and condenser, each evaporator being provided with a respective control means.

Hitherto, the control means has comprised a plurality of discrete valves interconnected by pipework comprising a plurality of discrete pipes. The pipework, comprising separate, interconnected, lengths of pipe, necessary to connect the various separate valve means to the evaporator and to the compressor and condenser are relatively complex and hence are expensive to manufacture and are labour intensive to service and to maintain. In addition, because the pipework has a large number of individual joints there is a significant risk of a joint failure, requiring expensive testing and repair procedures.

An object of the present invention is to provide a refrigerator unit of the kind specified provided with a control means whereby the above mentioned problem is overcome or is reduced.

SUMMARY OF THE INVENTION

According to the present invention we provide a refrigeration unit provided with a control means comprising a plurality of valve means, the control means comprising a unitary valve manifold adapted to have at least one of said valve means operatively mounted thereon.

The unit may comprise a unit of the kind specified and the control means may be of the kind described.

The valve manifold may be made as a casting and preferably as a one piece casting.

The valve manifold may comprise a generally planar lamina body having therein a first set of passages, for flow of refrigerant.

At least one passage of the set may have a mounting means to receive a said valve means.

The passages of the first set may be provided, intermediate their ends, with said mounting means for said valve means.

The mounting means may provide a housing portion of the valve means.

A valve seat may be provided in the housing portion.

A valve portion carrying a valve closure member may be mounted on the mounting means.

The passages of the first set may be provided in enlarged portions of the body which are of greater thickness than the thickness of the body between said enlarged portions.

The enlarged portions may be upstanding from one side surface only of the body.

The external surface of the enlarged portions may be of generally part-cylindrical configuration.

The mounting means may comprise generally cylindrical bosses provided on the valve body upstanding from said one surface thereof and merging with said enlarged portions which extend generally diametrically relative thereto.

The valve manifold may also have at least one second passage which interconnects at least two passages of the first set.

The second passage may be provided in an enlarged second portion of the manifold, which is of greater thickness than the thickness of the body between said enlarged portions and extending transversely relative to the passages of the first set.

The enlarged second portion may be upstanding from one side surface only of the body.

The external surface of the second enlarged portion may be of generally cylindrical configuration.

The second enlarged portion may intersect the first enlarged portions.

The second enlarged portion may extend along one side of the body.

The passages of the first set may be provided with shut-off valves.

The shut-off valves may be provided with mounting bosses which are upstanding above the said one surface of the body and intersecting the enlarged portions of the first set.

The shut-off valves may each provide an exit port which faces perpendicularly to the longitudinal extent of the first passages.

At least one of the first passages may be provided with an entry port which faces in the axial direction of the associated passage.

One of the first passages may be provided with an entry port which faces perpendicularly to the axial extent of the passage and which communicates with the second passage.

The passages may be made by drilling or otherwise cutting the passage in the material of the casting.

The valve manifold arrangement of the present invention provides a number of advantages compared with the previous arrangement of discrete valves and complicated pipework. The making of the manifold in one piece, facilitates service and maintenance since construction of a large number of individual joints and their checking and repair is avoided. In addition, the absence of pipework linking the valve means together means that the previously required brazed joints are eliminated and hence the valve manifold reduces the risk of leakage of the relatively expensive refrigerant gases to the atmosphere. Moreover, the valve manifold embodying the present invention is relatively compact and therefore occupies less space than the pipework previously required. In addition, all the valves are mounted on the top of the manifold and hence they are accessible and easily serviceable.

BRIEF DESCRIPTION OF THE DRAWINGS

An example of the invention will now be described with reference to the accompanying drawings wherein.

DESCRIPTION OF THE PREFERRED EMBODIMENTS

Figure 1:
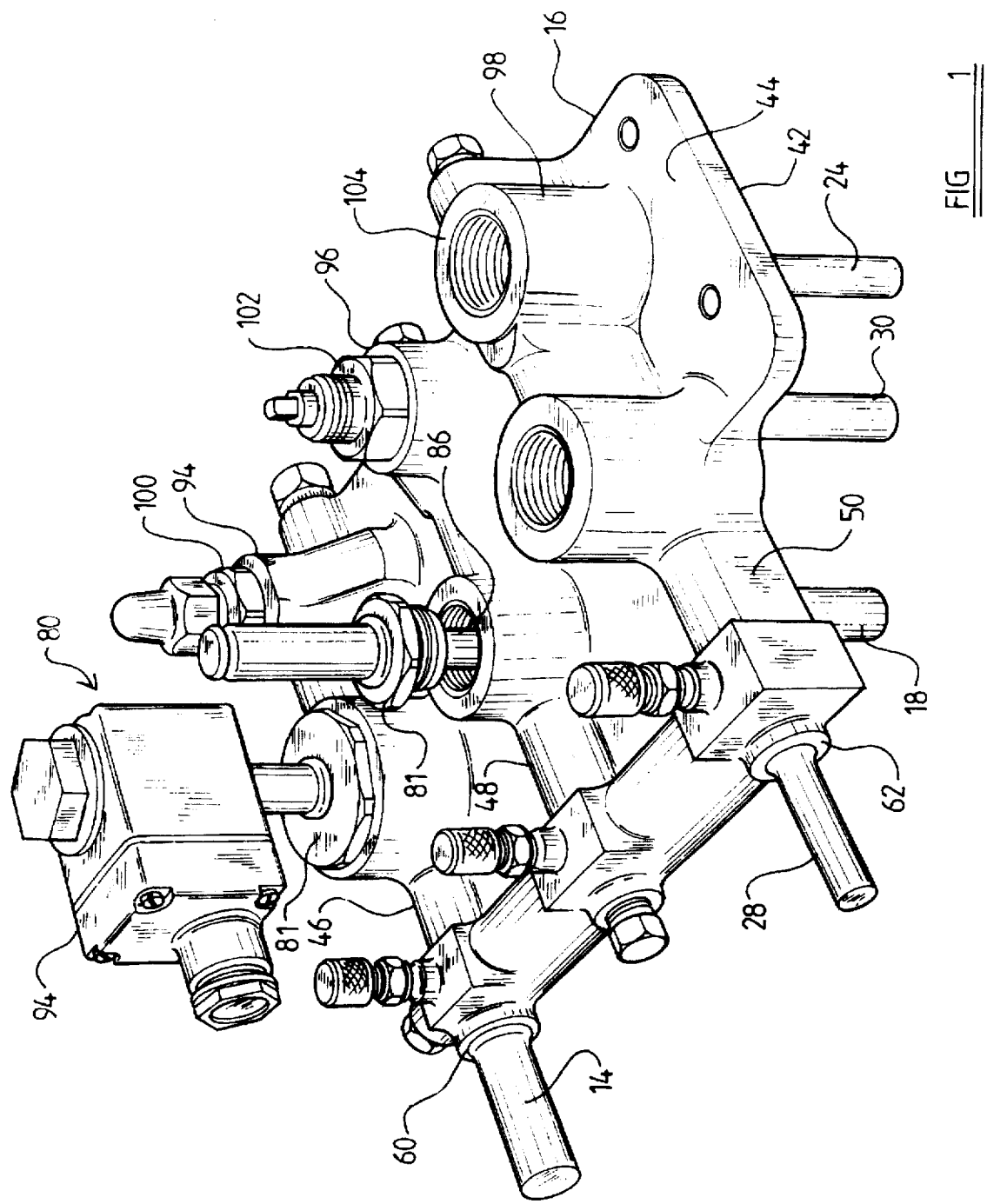
FIG. 1 is a perspective view, with parts omitted, of a valve manifold of a refrigeration unit embodying the invention.

Referring to the Figures, the refrigeration unit comprises an evaporator 10 disposed in a commercial refrigerator display case or a coldroom and intended for use in a supermarket or the like. The evaporator 10 has a working surface 12 which is in heat transfer relationship with the volume of the display case, coldroom or the like to be cooled. A refrigerant of conventional kind, such as CFC or hydrofluro carbons (HFC's), undergoes a liquid to vapour change to cool the working surface of the evaporator by virtue of the latent heat of vaporisation, in conventional manner. The refrigerant in vaporant state is fed on pipe 14 to a valve manifold 16 and thence via pipe 18 to a compressor 20. The compressor compresses the vapour to a second pressure which is higher than a first pressure which obtains in the evaporator 10 and feeds the compressed vapour on pipe 21 to a condenser 22 where the refrigerant undergoes a vapour to liquid phase change. The condenser 22 is connected by a pipe 24 to the valve manifold 16 where the refrigerant passes through an expansion valve means 26 and the valve manifold 16 is connected, on the low pressure side of the expansion valve means 26, to the evaporator 10 by pipe 28.

In addition, warm refrigerant gas for defrosting is fed, by pipe 30 which branches from the pipe 21, to the valve manifold 16.

The valve manifold 16 has a defrost valve 82 which, when open, permits the warm refrigerant gas to flow to the pipe 14 for defrosting of the evaporator 10, a differential pressure regulator 22a is provided to ensure flow of gas from pipes 24a to other refrigeration units.

The valve manifold 16 comprises a one piece casting in a suitable material such as brass or aluminum although, if desired, it may be made as a moulding in a suitable synthetic plastics material.

Figure 2:
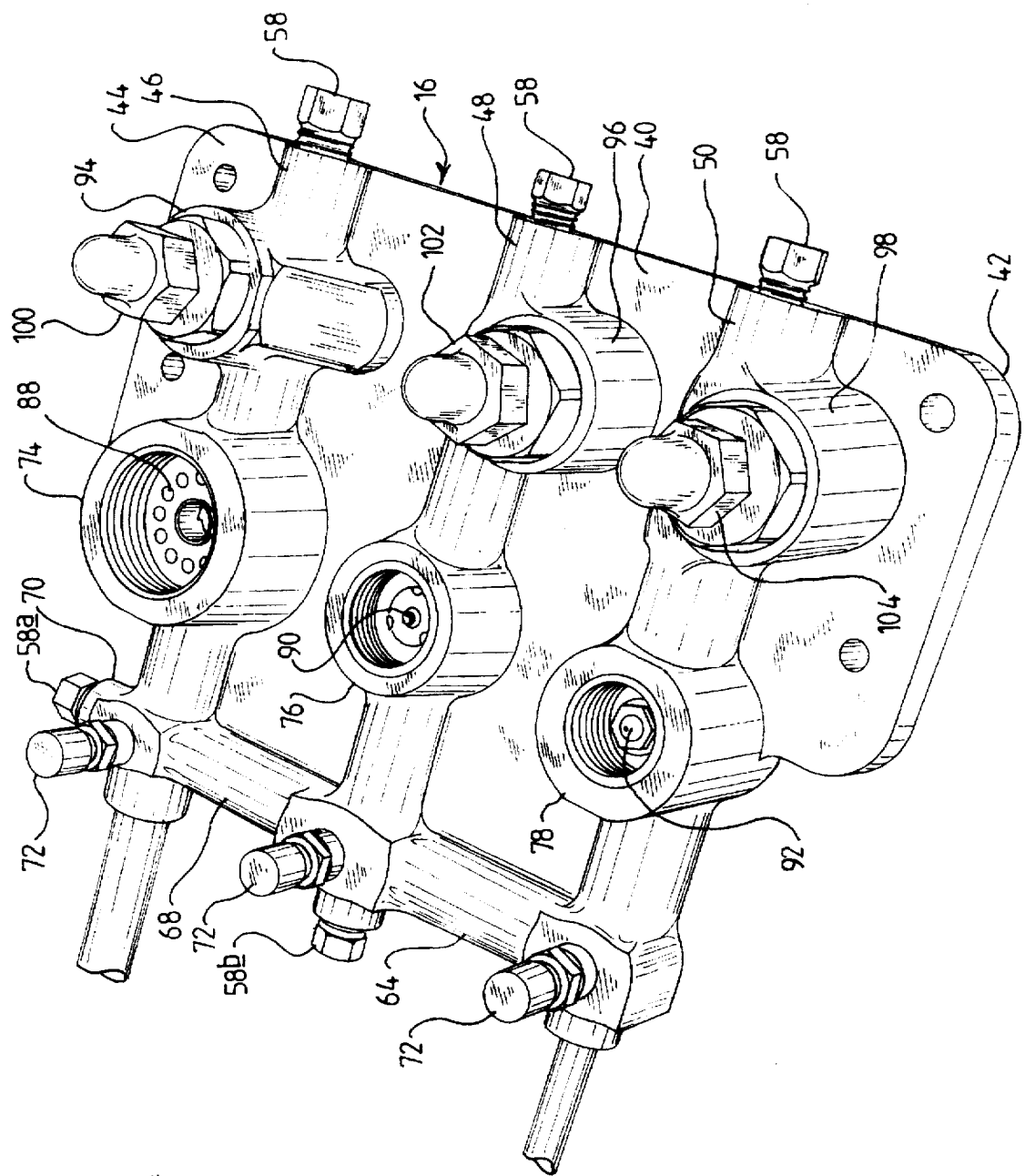
FIG. 2 is another perspective view of the valve manifold of FIG. 1 showing different parts omitted and viewed from a different angle.

The manifold 16 comprises a generally planar and lamina plate-like structure which is of generally T-shape in plan view, as best shown in FIG. 2. The undersurface 42 of the manifold is wholly planar whilst the upper surface 44 has a first set of enlarged thickness portions 46, 48, 50 which extend upwardly from the upper surface 44 and which are of generally part cylindrical configuration.

Figure 3:
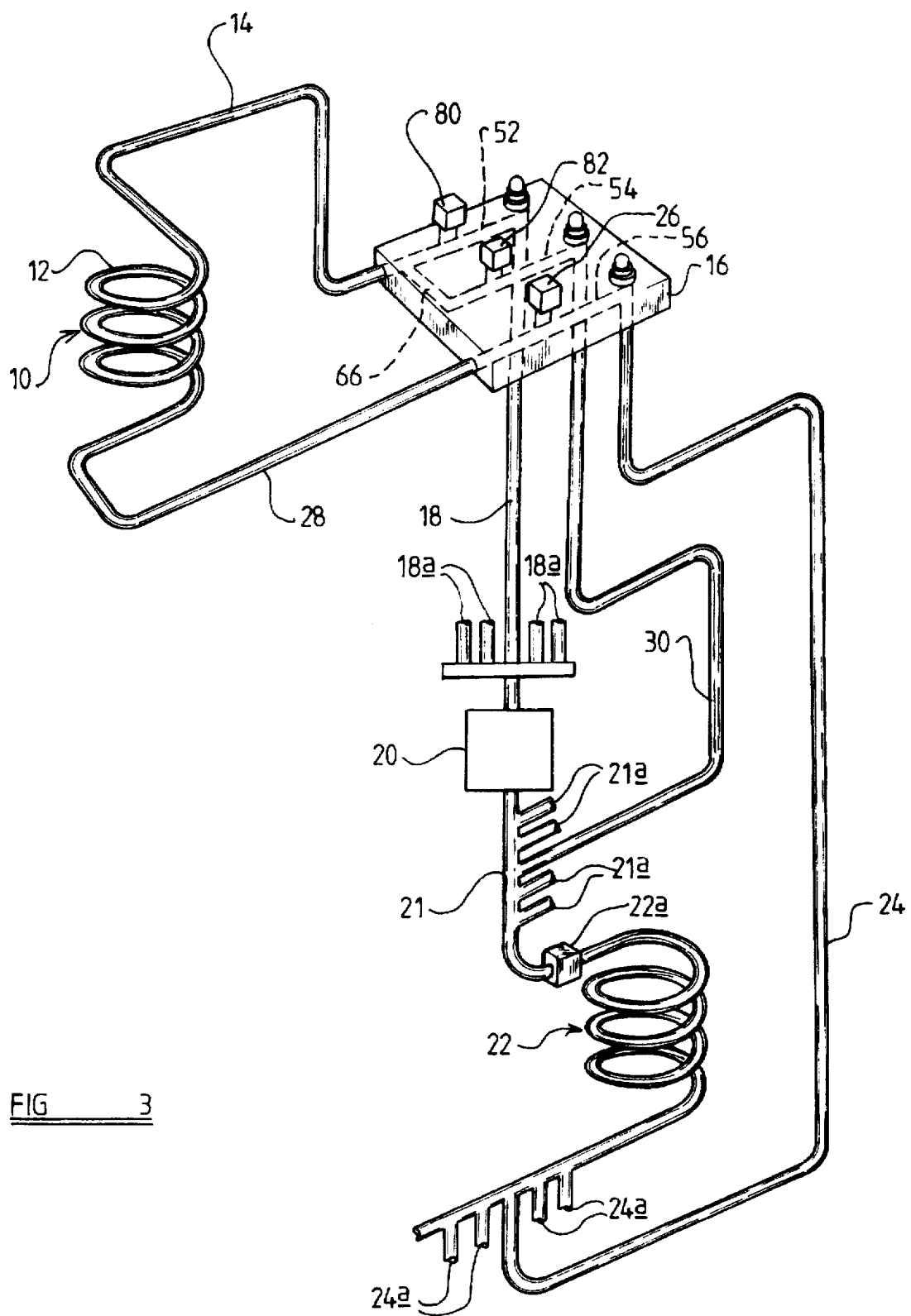
FIG. 3 is a diagrammatic illustration of a refrigeration unit embodying the invention.

Each enlarged thickness portion 46–50 is provided with an internal passage extending longitudinally of the portion 46–50 which provides a first set of passages 52–56, as best shown in FIG. 3. In the present example the passages 52–56 are made by drilling axially extending passages through the enlarged thickness portions 46–50. One end of each passage 52–56 is provided with an internal screw thread in which is received a closure plug 58.

At its other end the passage 52 is provided with a socket 60 in which the pipe 14 is sealingly received, for example by virtue of a brazed joint.

The passage 56 is similarly provided with a socket 62 in which the pipe 28 is similarly sealingly received.

A second enlarged portion 64 extends upwardly from the planar portion of the top surface 44 at right angles to the enlarged portions 46–50 of the first set and intersects these enlarged portions.

In the present example an internal second passage 66 is provided in the part 68 of the enlarged portion 64 between the enlarged portions 46 and 48 by virtue of drilling from one end 70 of the enlarged portion 64 only up to intersection with the passage 54 of the enlarged portion 48. The end 70 of the thus formed passage is provided with a screw thread in which a closure plug 58a is received. The end of the passage 54 remote from the closure plug 58 previously described is provided with a further closure plug 58b.

At the intersection of the enlarged portion 64 with the enlarged portions 46–50 a vertical passage is provided which intersects with the passages 52–56 and in each of which is received a Schedar valve 72 provided to give pressure readings for use in commissioning and fault diagnosis.

Each enlarged portion 46–50 is provided with a respective mounting 74, 76, 78 which respectively receive a suction control valve 80, a defrosting valve 82 and the refrigeration or expansion valve 26.

The mountings 74–78 comprise generally cylindrical bosses which provide a housing portion of the valve means and have a stepped bore, the lower part of which is of smaller diameter than the upper part and intersects the respective internal passage 52–56. The respective upper part is adapted to receive a valve portion 81 provided with an external screw thread which is received in the screw thread of the upper portion and which carries an axially slidable valve closure member, one of which is shown at 86 in FIG. 1, adapted to engage with a suitably configured valve seat 88, 90, 92 provided in the mounting part 74–78. The valve members 86, in the present example, are caused to move into and out of sealing engagement with the respective valve seat by a solenoid 94. If desired, however, the valves may be operated by any other suitable means and may, for example, in the case of the expansion valve 84, be electronically or thermostatically operable.

The enlarged portions 46–50 are provided with further mounting portions 94, 96, 98 in which manually operable shut-off valves 100, 102, 104 are received, the shut-off valves having manually operable valve members, not shown, movable into and out of sealing engagement with a valve seat to prevent flow of refrigerant between the associated passage 52–56 and the associated exit port to which the pipes 18, 30, 24 respectively are sealingly engaged in a similar manner to the pipes 14 and 28.

Generally, and as illustrated in the present example, a plurality of evaporators 10 and associated control means which, in the present example, is provided by the valve manifold 16 and associated valve means 80, 82 and 26 are connected to a single compressor 20 and condenser 22 or a series thereof. In the present example there are four other evaporators 10 and associated control units connected to the compressor 20 and condenser 22 as indicated by broken away pipes 18a, 21a and 24a, each of which leads to one of the additional four evaporator and control means assemblies which are identical to the above evaporator and control means described hereinbefore.

The shut-off valves 100, 102, 104 control, respectively, return of refrigerant from the evaporator 10, supply of defrosting gas to the evaporator 10 and supply of liquid refrigerant to the evaporator 10 as well as return of defrosting gas from the evaporator. These valves can be turned on and off manually if required, for example in the case of a breakdown, or if one of the valves 80, 82, 26 needs to be dismantled.

The valve 80 is a 240 volt electrically operated solenoid valve which automatically controls the return of refrigerant from the evaporator, whilst the valve 82 is a similar 240 volt electrically operated solenoid valve which controls the injection of warm refrigerant gas for defrosting.

The expansion valve 26 can either be an electronic or thermostatically controlled expansion valve and is used to control the flow of refrigerant liquid at the above flow rate at superheat level into the evaporator 10.

The features disclosed in the foregoing description, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

I claim:

1. A refrigeration unit provided with a control means comprising a plurality of valves, the control means comprising a unitary valve manifold adapted to have at least two of said valves operatively mounted thereon, said valve manifold comprising a body having therein a first set of passages, for flow of refrigerant, at least one passage of the first set having a mounting to receive a said valve, said passages being provided in enlarged portions of the body which are of greater thickness than the thickness of the body between said enlarged portions, said body between said enlarged portions being generally planar.

2. A unit according to claim 1 wherein said plurality of valves are selected from the group comprising a refrigeration/expansion valve to control the rate of flow of refrigerant to the evaporator, a suction control valve to control the flow of refrigerant from the evaporator, a de-frosting valve to control supply of warm refrigerant gas to the evaporator to control defrosting.

3. A unit according to claim 2 comprising an evaporator, having a working surface, in which a refrigerant under a first pressure undergoes a liquid to vapour phase change to cool the working surface of the evaporator, a compressor to compress the vapour to a second pressure, which is higher than the first pressure, means to feed the compressed vapour to a condenser where the refrigerant undergoes a vapour to liquid phase change, the condenser being connected to the evaporator through an expansion valve and the refrigerant being subjected to the second pressure on the side of the expansion valve connected to the condenser and to the first pressure on the side of the expansion valve connected to the evaporator and said control means being operable to control the flow of refrigerant through the evaporator.

4. A unit according to claim 1 wherein the valve manifold is made as a casting.

5. A unit according to claim 1 wherein at least one of the first passages is provided with an entry port which faces in the axial direction of the associated passage.

6. A unit according to claim 1 wherein the passages of the first set are provided, intermediate their ends, with said mounting for a said valve.

7. A unit according to claim 1 wherein the mounting provides a housing portion of the valve, a valve seat is provided in the housing portion, and a valve portion carrying a valve closure member is mounted on the mounting.

8. A unit according to claim 1 wherein the mounting comprises generally cylindrical bosses provided on the valve body upstanding from said one surface thereof and merging with said enlarged portions which extend generally diametrically relative thereto.

9. A unit according to claim 1 wherein the enlarged portions are upstanding from one side surface only of the body.

10. A unit according to claim 1 wherein the external surface of the enlarged portions is of generally part-cylindrical configuration.

11. A unit according to claim 1 wherein the valve manifold has at least one second passage which interconnects at least two passages of the first set.

12. A unit according to claim 11 wherein one of the first passages is provided with an entry port which faces perpendicularly to the axial extent of the passage and which communicates with the second passage.

13. A unit according to claim 11 wherein the passages of the first set are provided in enlarged portions of the body which are of greater thickness than the thickness of the body between said enlarged portions and wherein the second passage is provided in an enlarged second portion of the manifold, which is of greater thickness than the thickness of the body between said enlarged portions and extending transversely relative to the passages of the first set.

14. A unit according to claim 13 wherein the enlarged second portion is upstanding from one side surface only of the body.

15. A unit according to claim 13 wherein the second enlarged portion intersects the first enlarged portions.

16. A unit according to claim 13 wherein the second enlarged portion extends along one side of the body.

17. A unit according to claim 1 wherein the passages of the first set are provided in enlarged portions of the body which are of greater thickness than the thickness of the body between said enlarged portions, the passages of the first set are provided with shut-off valves and the shut-off valves are provided with mounting bosses which are upstanding above one surface of the body and intersect the enlarged portions of the first set.

18. A unit according to claim 17 wherein the shut-off valves each provide an exit port which faces perpendicularly to the longitudinal extent of the first passages.

* * * * *